United States Patent [19]
Wheat

[11] 3,946,703
[45] Mar. 30, 1976

[54] LIQUID FEEDER FOR ANIMALS
[75] Inventor: G. F. Roy Wheat, Oneonta, Ala.
[73] Assignee: Hold 'Em, Inc., Oneonta, Ala.
[22] Filed: Nov. 15, 1974
[21] Appl. No.: 523,975

[52] U.S. Cl.................................. 119/75; 119/51 R
[51] Int. Cl.².......................................... A01K 7/00
[58] Field of Search............ 119/75, 72.5, 51 R, 78, 119/80

[56]         References Cited
         UNITED STATES PATENTS
1,912,530   6/1933   Kubler.............................. 119/75 X
2,571,536   10/1951  Bush............................. 119/72.5 X
3,459,159   8/1969   Reed................................. 119/51 R
3,771,496   11/1973  Atchley............................. 119/75 X Primary Examiner—Louis G. Mancene
Assistant Examiner—J. N. Eskovitz
Attorney, Agent, or Firm—Woodford R. Thompson, Jr.

[57]         ABSTRACT

A liquid feeder for animals which includes a spherical member mounted for flotation in liquid feed carried by a receptacle with the upper surface of the spherical member being in position for animals to lick and thus rotate the spherical member to transfer feed to the upper surface thereof regardless of the direction of the lick.

6 Claims, 4 Drawing Figures

U.S. Patent March 30, 1976 3,946,703
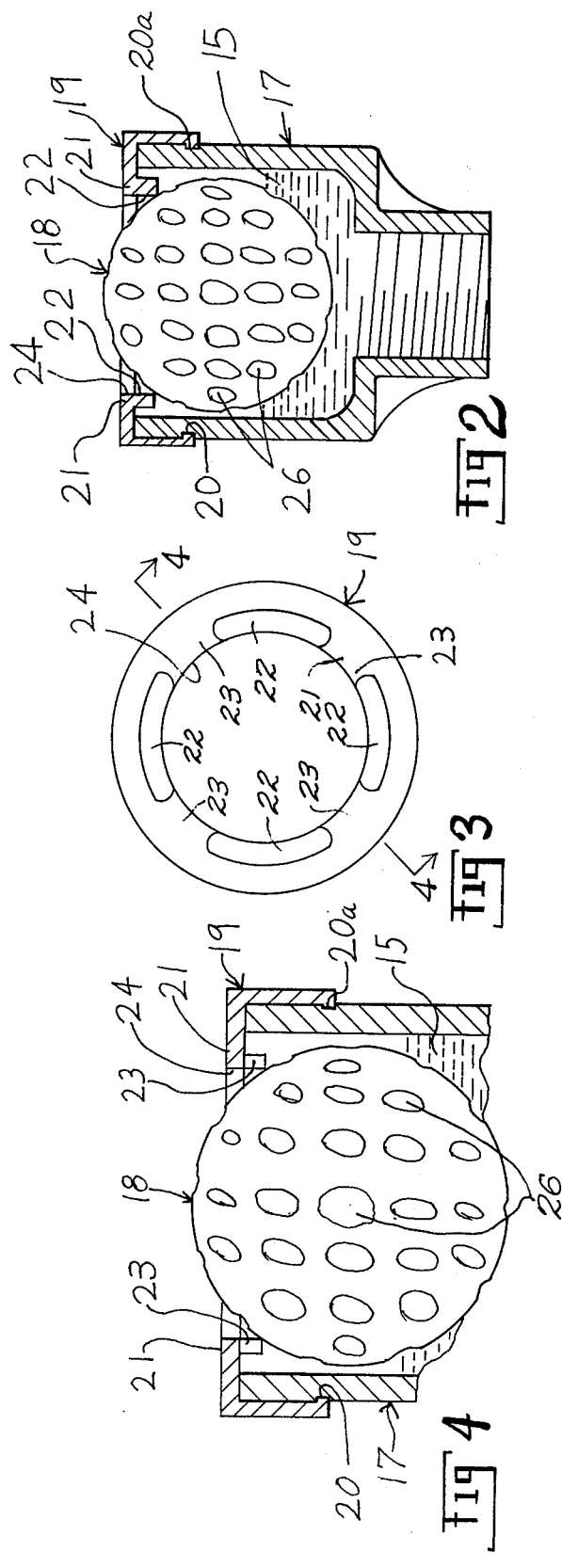
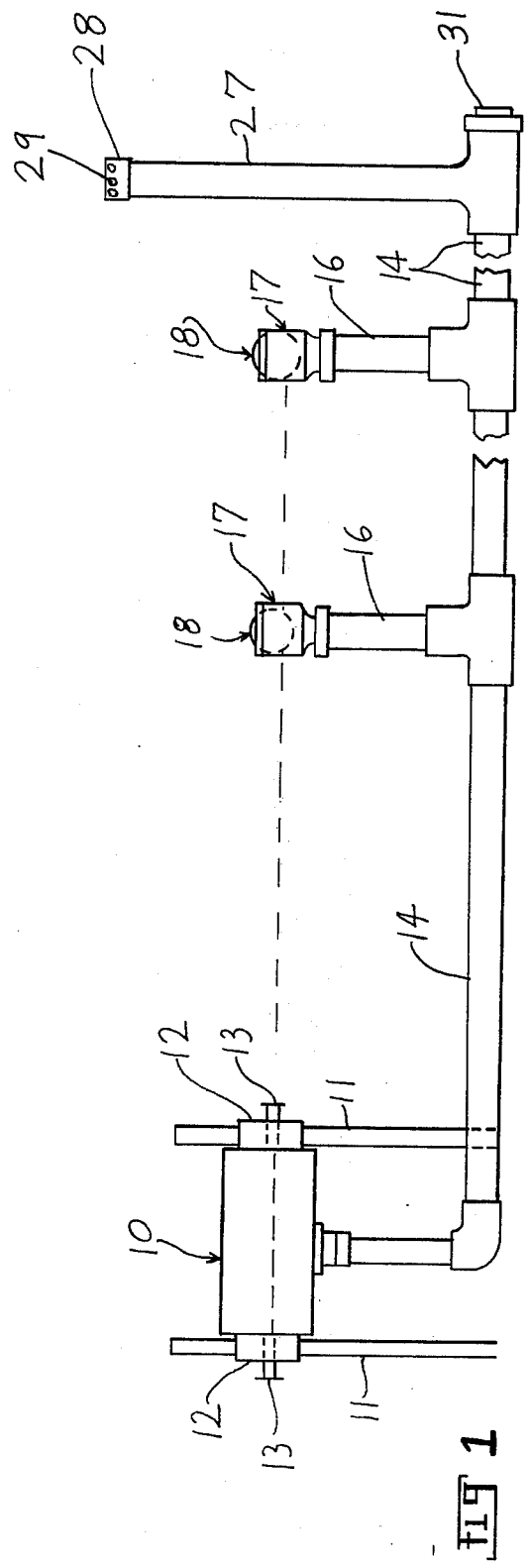

LIQUID FEEDER FOR ANIMALS

BACKGROUND OF THE INVENTION

This invention relates to a liquid feeder for feeding liquid nutrients, such as enriched molasses and the like, to animals, such as cattle.

Heretofore in the art to which my invention relates, it has been the usual practice to place liquid feeds in large tanks having covers thereover with rotatable wheels projecting upwardly through small openings in the cover. The rotatable wheels are submerged in the liquid feed so that as the animal licks the wheel in the direction of rotation of the wheel, the wheel is rotated to thus transfer the liquid feed to the upper exposed portion of the wheel in reach of the cattle. Not only do such rotatable wheels and large tanks require a considerable amount of space for installation, but it is necessary for the animal to lick the wheel in the direction of rotation so as to impart rotation to the rotatable wheel.

BRIEF SUMMARY OF THE INVENTION

In accordance with my invention, I provide a liquid feeder for animals which includes a spherical member mounted for flotation in liquid feed carried by an upwardly opening receptacle. The upper portion of the spherical member substantially closes the upper end of the receptacle whereby the uppermost surface of the spherical member is exposed and in position for animals to lick and thus rotate the spherical member to transfer feed to the upper surface thereof. In view of the fact that the spherical member is rotated regardless of the direction at which the animal licks the upper surface of the spherical member, it is not necessary for the animal to lick the spherical member in any particular direction. Accordingly, rotary motion is imparted to the spherical member each time the animal licks the upper surface thereof. The feed is thus dispensed with a minimum of effort on the part of the animal and at the same time a relatively small space is required to accommodate the rotary spherical member and its receptacle.

DESCRIPTION OF THE DRAWING

Apparatus embodying features of my invention is illustrated in the accompanying drawing forming a part of this application, in which:

FIG. 1 is a side elevational view, partly broken away, showing my improved liquid feeder for animals;

FIG. 2 is an enlarged, vertical sectional view through the apparatus which dispenses the liquid feed to the animals;

FIG. 3 is a bottom view of the annular member which surrounds the upper end of the receptacle shown in FIG. 2, the receptable and the spherical member associated therewith being omitted for the sake of clarity; and, FIG. 4 is a vertical sectional view corresponding to FIG. 2 but taken generally along the line 4—4 of the annular member which surrounds the upper end of the receptacle.

DETAILED DESCRIPTION

Referring now to the drawing for a better understanding of my invention, I show a liquid supply chamber 10 which is supported by adjustable legs 11 whereby the chamber 10 may be leveled. As shown in FIG. 1, the legs 11 extend through vertical, tubular members 12 carried by the supply chamber and are locked in selected positions by suitable means, such as lock screws 13. Communicating with the bottom of the supply chamber 10 is a supply conduit 14 which in turn communicates with a plurality of upstanding branch conduits 16. While I have shown two branch conduits 16, it will be apparent that one or more branch conduits may be employed.

Mounted at the upper end of each branch conduit 16 and communicating therewith is a receptacle 17 for receiving liquid feed, such as molasses and the like. As shown in FIGS. 2 and 4, the receptacle 17 is generally cup-shaped and is adapted to receive a spherical member 18 which floats in the liquid feed 15. Surrounding the upper end of the receptacle 17 is an annular member 19 which is provided with an inwardly extending lip 21 which is adapted to limit the upward movement of the spherical member 18 whereby the lower portion of the spherical member 18 is submerged in the liquid feed in the receptacle 17. As shown in FIG. 3, angularly spaced, arcuate members 22 are provided on the under surface of the inwardly extending lip 21 in position to engage the spherical member 18 above the center thereof to leave passageways 23 between adjacent arcuate members 22 for passing liquid feed. The spherical member 18 is mounted for free rotation in the receptacle 17 in position to float in the liquid feed 15 carried by the receptacle with a portion of the spherical member projecting upwardly through a centrally disposed opening 24 defined inwardly of the lip 21 to thus position the upper surface of the spherical member 18 in position for an animal to lick. An inturned annular flange 20 is provided adjacent the lower end of said annular member 19 in position to engage an annular groove $20^a$ provided in the outer surface of the receptacle 17 whereby the annular member is adapted to snap onto the top of the receptacle 17.

As the animal licks the upper surface of the spherical member 18, rotary motion is imparted thereto to transfer feed to the upper surface of the spherical member. As shown in FIGS. 2 and 4, indentations 26, such as dimples, are provided on the surface of the spherical member 18 whereby liquid feed flows into the indentations and thus moves with the spherical member as it is rotated. Also, the liquid feed in the indentations 26 is not scrapped off or removed as the spherical member 18 rotates against the arcuate members 22 carried by the inwardly extending lip 21.

As shown in FIG. 1, the supply chamber 10 is mounted at an elevation for the liquid feed to flow by gravity to the receptacle 17. The maximum height of the liquid level in the supply chamber 10 is at an elevation subjacent the elevation of the upper end of each receptacle 17 whereby the liquid feed will not overflow from the receptacle 17. As shown in FIGS. 2 and 4, the receptacle 17 is of a depth greater than the diameter of the spherical member 18 so that the spherical member moves downwardly out of the reach of animals as the liquid level in the receptacle 17 moves downwardly a predetermined distance. Accordingly, the amount of liquid feed dispensed through the receptacle 17 may be controlled by varying the elevation of the liquid feed in the supply chamber 10.

Communicating with the end of the supply conduit 14 is an upstanding conduit 27 which extends to an elevation above the maximum liquid level in the supply chamber 10 and above the upper end of the receptacles 17. Mounted on the upper end of the conduit 27 is a suitable breather cap 28 having a plurality of openings 29 therein which permits the escape of any gases whereby there is even flow of the liquid feed to the branch conduits 16. A suitable clean-out plug 31 is mounted in the end of the supply conduit 14, as shown in FIG. 1.

From the foregoing description, the operation of my improved liquid feeder will be readily understood. The supply tank 10 is mounted at an elevation relative to the receptacle 17 whereby the maximum elevation of the liquid feed in chamber 10 is subjacent the upper ends of the receptacles 17 to prevent overflow of liquid feed from the receptacles 17. As the liquid feed flows through the supply conduit 14, any gases in the conduit are discharged through the breather openings 29 so that the liquid feed flows freely into the branch conduits 16. Any gases in the branch conduits 16 are discharged through the open ends of the cup-shaped receptacles 17. That is, the gases are free to flow around the spherical member 18. As the level of the liquid feed in the receptacle 17 rises, the spherical member 18 moves upwardly whereby the upper surface thereof projects through the centrally disposed opening 24. Accordingly, the upper surface of the spherical member 18 is in position to be licked by animals. As the animals, such as cattle, lick the upper surface of the spherical member 18, rotary motion is imparted thereto whereby the liquid feed on the surface of the spherical member is transferred to the uppermost position in easy reach of the cattle. Accordingly, liquid feed is continuously supplied to the uppermost surface of the spherical member 18 as the cattle lick the feed therefrom.

From the foregoing, it will be seen that I have devised an improved liquid feeder for animals. By providing a spherical member which is mounted for flotation in the upper end of a cup-shaped member, rotary motion is imparted to the spherical member regardless of the direction of the lick by the animal. Accordingly, each time an animal licks the upper portion of the spherical member 18, some rotary motion is imparted thereto. Also, by providing the spherical member within the receptacle, the liquid feeder takes up a minimum of space whereby it is particularly adapted for use in a dairy cattle milking parlor. The small and compact unit thus provides an adequate and controlled amount of liquid feed in an easily accessible manner to the animal.

While I have shown my invention in but one form, it will be obvious to those skilled in the art that it is not so limited, but is susceptible of various other changes and modifications without departing from the spirit thereof.

What I claim is:
1. A liquid feeder for animals comprising:
   a. a receptacle for receiving liquid feed and having an opening in the upper end thereof, (and)
   b. a spherical member mounted for rotation in said receptacle in position to float in the liquid feed carried by said receptacle with a portion of said spherical member projecting upwardly through said opening with the upper surface of said spherical member in position for an animal to lick and thus rotate said spherical member to transfer feed to the upper surface thereof, and
   c. a feed supply chamber communicating with said receptacle and mounted at an elevation for the liquid feed to flow by gravity to said receptacle with the maximum height of the liquid level in said supply chamber being at an elevation subjacent the elevation of the upper end of said receptacle so that liquid feed will not overflow from said receptacle by gravity.
2. A liquid feeder as defined in claim 1 in which at least one inwardly extending lip is carried by the upper portion of said receptacle in position to limit upward movement of said spherical member so that the lower portion of said spherical member is submerged in the liquid feed in said receptacle.
3. A liquid feeder as defined in claim 2 in which said inwardly extending lip carries angularly spaced arcuate members which engage said spherical member above the center thereof with passageways being left between adjacent arcuate members for passing liquid feed.
4. A liquid feeder as defined in claim 2 in which said inwardly extending lip is carried by an annular member attached to the upper end of said receptacle.
5. A liquid feeder as defined in claim 1 in which indentations are provided in the outer surface of said spherical member.
6. A liquid feeder as defined in claim 1 in which said receptacle is of a depth greater than the diameter of said spherical member so that said spherical member moves downwardly out of the reach of animals as the liquid level in said receptacle moves downwardly a predetermined distance.

* * * * *